United States Patent Office 3,644,451
Patented Feb. 22, 1972

3,644,451
ORGANOLEAD MAGNESIUM COMPOUNDS
Kenneth C. Williams and Shirl E. Cook, East Baton Rouge, La., assignors to Ethyl Corporation, New York, N.Y.
No Drawing. Continuation-in-part of application Ser. No. 848,358, Aug. 7, 1969. This application Oct. 17, 1969, Ser. No. 867,351
Int. Cl. C07f 7/24
U.S. Cl. 260—437 R    11 Claims

ABSTRACT OF THE DISCLOSURE

Stabilized trialkylleadmagnesium halides as new compositions of matter and method of making same wherein a Grignard reagent (RMgX, wherein R is an organic radical and X a halogen) is reacted with a lead halide or lead carboxylate in the presence of an ether more basic than diethyl ether.

CROSS-REFERENCES TO RELATED APPLICATIONS

This application is a continuation-in-part application of U.S. application Ser. No. 848,358, filed Aug. 7, 1969.

BACKGROUND OF THE INVENTION

Field of the invention

The present invention relates broadly to the field of organolead compounds. It particularly relates to intermediate compounds used in the preparation of symmetrical and unsymmetrical organolead and di-lead compounds.

Description of the prior art

Organolead compounds are especially valauble as antiknock compounds in gasoline. Tetraalkylleads, principally tetraethyllead and tetramethyllead, have been widely used commercially for such purpose. Most of the methods of making organolead compounds result in the formation of free lead, which is undesirable both from a handling standpoint and an economic standpoint.

One of the most widely used laboratory methods of preparing tetraalkyllead compounds ($R_4Pb$) is from the reaction of lead chloride ($PbCl_2$) and an organomagnesium or other metal derivative (RM) in ether as follows:

$$4RM + 2PbCl_2 \xrightarrow[\text{ether}]{\text{heat}} R_4Pb + Pb + 4MCl$$

When using an alkyl magnesium halide, the foregoing equation encompasses the following steps:

(1) $2RMgX + PbCl_2 \rightarrow R_2Pb + MgX_2 + MgCl_2$
(2) $3R_2Pb \rightarrow R_6Pb_2 + Pb$
(3) $2R_6Pb_2 \rightarrow 3R_4Pb + Pb$ Organolead metal compounds ($R_3Pb$—M) have been known for a number of years. Trialkylplumbylsodium and triarylplumbylsodium derivatives, triarylplumbyllithiums (namely, triphenylplumbyllithium) and triarylplumbylmagnesium bromides (namely, trimesitylplumbylmagnesium bromide and triphenylplumbylmagnesium bromide) have been described in the literature. In 1939, H. Gilman and J. C. Bailie proposed the possible existence of a compound of the type $R_3PbMgBr$ in the reaction of triethyllead bromide and magnesium metal to produce tetraethyllead. No trialkylplumbylmagnesium halides have been subsequently reported.

SUMMARY OF THE INVENTION

It has been discovered that many new organolead compounds can be prepared using trialkylplumbylmagnesium halide compounds and organic polyhalides. The trialkylplumbylmagnesium halide compounds may be first synthesized by reacting a Grignard reagent (RMgX) with a lead halide. The resulting mixture or the lead-magnesium complex is then reacted with an organic polyhalide to produce a unique organolead compound. These two reactions may be summarized as follows:

(1) $3RMgX + PbX'_2 \rightarrow R_3PbMgX + MgX'_2 + MgX_2$
(2) $2R_3PbMgX + R'X'_2 \rightarrow (R_3Pb)_2R' + MgX_2 + MgX'_2$ wherein:
R=any organic radical
R'=any organic di-radical
X=any halogen
X'=any halogen or carboxylate The reactions are carried out in the presence of a catalyst and/or solvent which is an ether more basic than diethyl ether. Tetrahydrofuran (THF) is a preferred solvent and/or catalyst.

The reaction is also carried out at a temperature of from about $-10°$ C. to about $30°$ C. Low temperatures are preferred, and optimum results are obtained at a temperature of about $5°$ C.

The reaction may also be carried out in a one step reaction wherein a Grignard reagent and an organo polyhalide are mixed together in a catalyst or solvent and subsequently a lead halide or lead carboxylate is added to the mixture. This reaction is summarized as follows:

$$6RMgX + R'X'_2 + 2PbX''_2 \rightarrow$$
$$(R_3Pb)_2R' + 3MgX_2 + MgX'_2 + 2MgX''_2$$

wherein:
R=any organic radical
R'=any organic di-radical
X=any halogen
X'=any halogen or carboxylate
X''=any halogen or carboxylate The catalyst and the temperature conditions are the same as for the foregoing reactions.

It is a primary object of the present invention to provide new trialkylleadmagnesium halides for use in further preparing lead alkyls and lead alkyl derivatives for use as gasoline antiknock compounds.

Another important object of the present invention is to provide a new and improved method of making trialkylleadmagnesium halides.

Another principal object of the present invention is to provide stabilized trialkylleadmagnesium halides.

Other objects and advantages of the present invention will become more readily apparent from a reading of the description and claims hereinafter.

DESCRIPTION OF THE PREFERRED EMBODIMENT

In one preferred form of the invention, an organoleadmagnesium chloride is prepared from a Grignard reagent (EtMgCl or MeMgCl) and lead chloride and then reacted with methylene chloride. The reaction is carried out using tetrahydrofuran (THF) as a catalyst or solvent at a temperature of $5°$ C. The reaction steps may be summarized as follows:

(1)
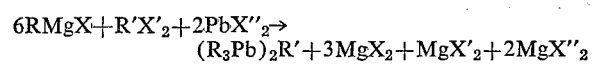
$3CH_3CH_2MgCl + PbCl_2 \xrightarrow{THF} (CH_3CH_2)_3PbMgCl + 2MgCl_2$ (2) $2(CH_3CH_2)_3PbMgCl + CH_2Cl_2 \rightarrow$
$(CH_3CH_2)_3Pb-CH_2-Pb(CH_3CH_2)_3 + 2MgCl_2$ The reaction may also be carried out as a one step reaction as follows:

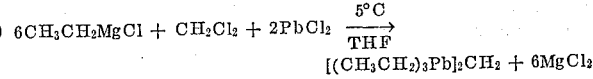
$6CH_3CH_2MgCl + CH_2Cl_2 + 2PbCl_2 \xrightarrow[THF]{5°C}$
$[(CH_3CH_2)_3Pb]_2CH_2 + 6MgCl_2$ In this reaction, the lead salt is added to a solution containing both the Grignard reagent and the organo polyhalide.

Lead acetate may be substituted for lead chloride and a number of organoleadmagnesium salts may be obtained by varying the lead salt and the organo radical of the Grignard reagent.

When preparing trialkylplumbylmagnesium chloride, it is necessary that the lead salt be added to the Grignard reagent to prevent the formation of free lead metal. By varying the reactant, numerous organolead compounds are synthesized.

Table I hereinafter illustrates the products formed by reacting trialkylplumbylmagnesium chlorides with an organo polyhalide or an organo silicon halide and the yield thereof;

TABLE I

| $R_3PbMgCl$ | Reactant | Product | Yield |
|---|---|---|---|
| $(C_2H_5)_3PbMgCl$ | $(CH_3)_3SiCH_2Cl$ | $(C_2H_5)_3Pb-CH_2-Si(CH_3)_3$ | 73 |
| $(C_2H_5)_3PbMgCl$ | $CH_2Cl_2$ | $[(C_2H_5)_3Pb]_2CH_2$ | 81 |
| $(CH_3)_3PbMgCl$ | $CH_2Cl_2$ | $[(CH_3)_3Pb]_2CH_2$ | 80 |
| $(CH_3)_3PbMgCl$ | $(CH_3)_3SiCH_2Cl$ | $(CH_3)_3Pb-CH_2-Si(CH_3)_3$ | 70 |

The process of this invention and the new compounds produced thereby may be more completely understood and illustrated by the following examples.

GENERAL PROCEDURE

All reactions were carried out under a nitrogen atmosphere. Tetrahydrofuran (THF) was distilled from lithium aluminum hydride before use. Anhydrous lead acetate was obtained by heating the trihydrate at 110° C. for several hours under a vacuum or removal of the water of hydration by azeotropic distillation with toluene.

The reactions were performed in a 500 ml. or 1000 ml. three-necked round-bottom flask equipped with condenser (Dewar filled with Dry Ice-acetone) and magnetic or paddle stirrer. The lead salt was added from a 50 ml. round-bottom flask connected to the reaction vessel by a short piece of Gooch tubing. The Grignard reagents were prepared from magnesium turnings and a slight excess of the alkyl halide. The excess alkyl halide was then removed by heating at reflux for a few minutes under a nitrogen flush.

Lead contents of the new organolead derivatives were determined by reaction with bromine in carbon tetrachloride, destruction with nitric and perchloric acid and titration with EDTA to the endpoint using xylenol orange as indicator.

During the hydrolysis of the reaction mixtures enough dilute HCl was added to solubilize the precipitated magnesium salts.

Triethylplumbylmagnesium chloride or trimethylplumbylmagnesium chloride was prepared as follows: A Grignard solution prepared from 8.0 g. (0.33 g.-atom) of magnesium and an equivalent amount of methyl chloride or ethyl chloride in 400 ml. of THF was treated slowly at 5° C. with 27.8 g. (0.1 m.) of lead chloride. Greenish-brown and homogeneous solutions containing the complexes were obtained. Derivatives of the compounds were prepared as described in the examples hereinafter.

EXAMPLE I

Bis(triethylplumbyl)methane. — Triethylplumbylmagnesium chloride was prepared from 16.0 g. (0.66 g.-atom) of magnesium, an equivalent amount of ethyl chloride ind 55.6 g. (0.2 m.) of lead chloride at 5° C. in 900 ml. of THF. To the solution was added 30 ml. (excess) of methylene dichloride. The mixture was stirred at 5° C. for 15 minutes, 15 minutes at ambient temperature, and 10 minutes at 50° C. The greenish-brown color disappeared and a gelatinous precipitate (magnesium chloride-THF etherates) was formed. The mixture was hydrolyzed with 300 ml. of water and the THF was removed by distillation. The organolead product was separated and washed several times with water. An attempt was made to vacuum distill the product but considerable decomposition occurred. Purification was achieved by removing the volatile impurities by steam distillation. After separation 48.5 g. (81 percent) of colorless nondistillable product was obtained.

Analysis.—Calcd. for $C_{13}H_{32}Pb_2$: Pb, 68.75. Found: Pb, 68.65.

EXAMPLE II (Triethylplumbyl)(trimethylsilyl)methane. — Triethylplumbylmagnesium chloride was prepared from 16.0 g. (0.66 g.-atom) of magnesium, an equivalent amount of ethyl chloride and 55.6 g. (0.2 m.) of lead chloride at 5° C. in 900 ml. of THF. To the solution was added 25 g. (0.2 m.) of chloromethyltrimethylsilane. The mixture was warmed to ambient temperature and stirred for 30 minutes and at 50° C. for 10 minutes. The mixture was hydrolyzed with 300 ml. of water and the THF was removed by distillation. The organolead product was separated from the aqueous layer and washed several times with water. Vacuum distillation gave 55.3 g. (73 percent) of colorless product boiling at 57–59° C. (0.5 mm.).

Analysis.—Calcd. for $C_{20}H_{26}SiPb$: Pb, 54.29. Found: Pb, 54.69.

EXAMPLE III

Bis(trimethylplumbyl)methane. — Trimethylplumbylmagnesium chloride was prepared from 8.0 g. (0.33 g.-atom) of magnesium, an equivalent amount of methyl chloride and 27.8 g. (0.1 m.) of lead chloride at 50° C. in 400 ml. of THF. To the complex was added 15 ml. (excess) of methylene dichloride and the mixture was stirred for 30 minutes at 5° C. The ice bath was removed and the reaction mixture was warmed to 50° C. for 15 minutes. The greenish-brown color disappeared and a gelatinous precipitate was formed. The mixture was hydrolyzed with 300 ml. of water and the THF was removed by distillation. The organolead product was separated from the aqueous layer and washed several times with water. Vacuum distillation gave 21 g. (80 percent) of colorless product boiling at 57–59° C. (0.3 mm.).

Analysis.—Calcd. for $C_7H_{20}Pb_2$: Pb, 79.92. Found: Pb, 80.07.

EXAMPLE IV (Trimethylplumbyl)(trimethylsilyl)methane. — Trimethylplumbylmagnesium chloride was prepared from 8.0 g. (0.33 g.-atom) of magnesium, an equivalent amount of methyl chloride and 27.8 g. (0.1 m.) of lead chloride as described above at 5° C. To the solution was added 12.2 g. (0.1 m.) of chloromethyltrimethylsilane. The ice bath was removed and the solution was warmed to ambient temperature and stirred for 25 minutes. The greenish-brown color disappeared and a gelatinous precipitate was formed. The mixture was hydrolyzed with 300 ml. of water and the THF was removed by distillation. The heavy organolead product was separated from the aqueous layer and washed several times with water. Vacuum distillation gave 23.6 g. (70 percent) of colorless product boiling at 34–35° C. (0.3 mm.).

Analysis.—Calcd. for $C_7H_{20}SiPb$: Pb. 61.02. Found: Pb, 60.83.

Halogens suitable for use in the instant invention may be chlorine, bromine, and iodine.

Some examples of polyhalogenated hydrocarbons which may be used in preparing the unique organolead compounds of this invention are: 1,2-dichloroethane; 1,2-dichloropropane; 1,2-dichlorobutane; 2,3-dibromobutane; 1,2-diiodopentane; 1,4-dibromo-2-butene; 1,2-dibromopropane; 1,1,1 - trichloropropanone; methylene chloride; methylene bromide; methylene iodide; chloroform; bromoform; iodoform; carbon tetrafluoride; carbon tetrachloride; carbon tetrabromide; dichlorodifluoromethane; ethylene dibromides; ethylidene chloride; ethylidene bromide; tetrachloroethane; hexachloroethane; dichloroethylene; trichloroethylene; trimethylene bromide; tetramethylene bromide; pentamethylene bromide; and hexamethylene bromide.

Carboxylates suitable for use in the instant invention are those having the formula RCOO, wherein R=hydrogen, alkyl group, halogen-substituted alkyl group, hydroxy-substituted alkyl group, oxy-substituted alkyl group, thio-substituted alkyl group, cyano-substituted alkyl group, glyoxy-substituted alkyl group, aryl group, ethylenic-substituted alkyl group, and carboxy acid-substituted alkyl group.

The products of this invention possess considerable utility. They are not only valuable as intermediate compounds for use in preparing antiknock agents for hydrocarbons but also may find use as fungicides, mildewcides, pesticides, herbicides and nematodecides.

The compounds of the present invention may find wide usage in both the agriculture and marine protection fields.

The foregoing disclosure and description of the invention is illustrative and explanatory thereof and various changes may be made within the scope of the appended claims without departing from the spirit of the invention.

What is claimed is:

1. A new composition of matter having substantially the following chemical formula:

$$R_3PbMgX$$

wherein
R is a lower alkyl radical and,
X is a halogen selected from the group consisting of chlorine, bromine and iodine 2. A stabilized new composition of matter having substantially the following chemical formula:

$$(C_2H_5)_3PbMgCl$$

3. A stabilized new composition of matter having substantially the following chemical formula:

$$(CH_3)_3PbMgCl$$

4. A method of preparing a stabilized trialkyllead magnesium halide, substantially in accordance with the following chemical reaction, the reaction being carried out in the presence of an ether more basic than diethyl ether:

$$3RMgX + PbX'_2 \rightarrow R_3PbMgX + MgX'_2MgX_2$$

wherein
R = a lower alkyl radical

X = a halogen selected from the group consisting of chlorine, bromine or iodine
X' = a halogen selected from the group consisting of chlorine, bromine or iodine or carboxylate.

5. The method of claim 4, wherein said ether is tetrahydrofuran.

6. The method of claim 4, wherein the reaction is carried out at a temperature of from about −10° C. to about 30° C.

7. The method of claim 4, wherein the reaction is carried out at a temperature of about 5° C.

8. A method of preparing a stabilized trialkyllead chloride comprising the steps of reacting a Grignard reagent (RMgCl, wherein R is a lower alkyl radical) with lead chloride or lead acetate in the presence of an ether more basic than diethyl ether, thereby forming a stabilized trialkylplumbylmagnesium chloride.

9. The method of claim 8, wherein the reaction is carried out at a temperature of from about −10° C. to about 30° C.

10. The method of claim 8, wherein the reaction is carried out at a temperature of about 5° C.

11. The method of claim 8, wherein said ether is tetrahydrofuran.

References Cited

UNITED STATES PATENTS

| | | | |
|---|---|---|---|
| 1,690,075 | 10/1928 | Kraus et al. | 260—437 |
| 1,705,723 | 3/1929 | Daudt | 260—437 |
| 1,798,593 | 3/1931 | Daudt | 260—437 |
| 1,863,451 | 6/1932 | Proffitt et al. | 260—437 |
| 2,447,926 | 8/1948 | Wiczer | 260—437 X |
| 3,062,853 | 11/1962 | Pagliarini | 260—437 |
| 3,444,223 | 5/1969 | Gorsich | 260—437 |
| 3,488,369 | 1/1970 | Williams | 260—437 |

OTHER REFERENCES

Glockling et al. J. Chem. Soc. (1961) pp. 4405–9.

Shapiro et al., The Organic Compounds of Lead, Interscience Publ. John Wiley & Sons, New York, pp. 27–32 (1968).

TOBIAS E. LEVOW, Primary Examiner

H. M. S. SNEED, Assistant Examiner

U.S. Cl. X.R.

260—437 S